United States Patent
Dethe et al.

(10) Patent No.: US 11,429,492 B2
(45) Date of Patent: Aug. 30, 2022

(54) PROTECTING AND IDENTIFYING VIRTUAL MACHINES THAT HAVE THE SAME NAME IN A MULTI-TENANT DISTRIBUTED ENVIRONMENT

(71) Applicant: EMC IP Holding Company LLC, Hopkinton, MA (US)

(72) Inventors: Tushar Dethe, Bangalore (IN); Shubhashish Mallik, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 184 days.

(21) Appl. No.: 15/964,545

(22) Filed: Apr. 27, 2018

(65) Prior Publication Data
US 2019/0332497 A1    Oct. 31, 2019

(51) Int. Cl.
*G06F 11/14* (2006.01)
*G06F 9/455* (2018.01)

(52) U.S. Cl.
CPC ...... *G06F 11/1464* (2013.01); *G06F 9/45558* (2013.01); *G06F 2009/45583* (2013.01); *G06F 2201/815* (2013.01)

(58) Field of Classification Search
CPC .......... G06F 11/1464; G06F 9/45558; G06F 2009/45583; G06F 2201/815
See application file for complete search history.

(56) References Cited

U.S. PATENT DOCUMENTS

| | | | | |
|---|---|---|---|---|
| 5,900,001 A | * | 5/1999 | Wolczko | G06F 16/289 |
| 7,290,056 B1 | * | 10/2007 | McLaughlin, Jr. | H04L 43/0852 709/201 |
| 9,659,021 B1 | * | 5/2017 | Dobrean | G06F 16/13 |
| 2004/0186900 A1 | * | 9/2004 | Nakano | G06F 11/1448 709/213 |
| 2005/0193245 A1 | * | 9/2005 | Hayden | G06F 11/2069 714/13 |
| 2007/0006018 A1 | * | 1/2007 | Thompson | G06F 11/1466 714/6.12 |
| 2009/0288084 A1 | * | 11/2009 | Astete | G06Q 30/0601 718/1 |
| 2010/0070725 A1 | * | 3/2010 | Prahlad | G06F 11/1453 711/162 |
| 2015/0139238 A1 | * | 5/2015 | Pourzandi | H04L 45/64 370/392 |
| 2015/0142750 A1 | * | 5/2015 | Mutalik | G06F 11/1461 707/654 |
| 2015/0281048 A1 | * | 10/2015 | Agarwal | H04L 61/2007 370/236 |
| 2016/0019317 A1 | * | 1/2016 | Pawar | G06F 16/907 707/649 |
| 2018/0004576 A1 | * | 1/2018 | Gokurakuji | G06F 9/46 |

* cited by examiner

*Primary Examiner* — Alford W Kindred
*Assistant Examiner* — Lin Lin M Htay
(74) *Attorney, Agent, or Firm* — Workman Nydegger

(57) ABSTRACT

Systems and methods for protecting and identifying virtual machines that have the same name in a multi-tenant distributed environment are provided. When backing up a virtual machine, a unique identifier of the virtual machine is incorporated into the name of the virtual machine's save set. This allows a backup administrator to distinguish between virtual machines that have the same name. This improves the ability to perform restore operations by enabling virtual machines that have the same name to be distinguished.

14 Claims, 6 Drawing Sheets

PROTECTING AND IDENTIFYING VIRTUAL MACHINES THAT HAVE THE SAME NAME IN A MULTI-TENANT DISTRIBUTED ENVIRONMENT

FIELD OF THE INVENTION

Embodiments of the present invention relate to systems and methods for protecting data. Embodiments of the present invention more specifically relate to systems and methods for identifying and protecting virtual machines in a multi-tenant distributed environment, for example in a datacenter.

BACKGROUND

Datacenters/cloud are often built on multi-tenancy architecture where a hypervisor cluster is used by number of users or user groups to create/delete/use resources like virtual machines, storage and network resources. In this type of environment, virtual machines are often created, deleted, migrated, backed up, restored, and the like. Unfortunately, in this type of environment, virtual machines that have the same name may be created or may exist within the hypervisor cluster. It is very common, for example, for different tenants to create virtual machines that have the same name in a hypervisor cluster.

In a distributed multi-tenant environment, the backups are typically configured at the cluster level. Because the backup is performed at the cluster level and because virtual machines may have the same name, the restore process may be difficult. More specifically, a backup administrator rarely looks at the number of different resources, such as virtual machines, present inside the cluster because the resources inside such a huge environment are always changing.

In the context of backing up a large of amount of resources or data (e.g., virtual machines), such as may be found in a multi-tenant hypervisor cluster (or other computing configuration), finding and recovering the resource whose name is duplicated is a painful and time-consuming task for a backup administrator. Further, the backup administrator may end up restoring the wrong resource because of name confusion. Restoring the wrong resource or virtual machine may lead to longer restore times, customer complaints and problem escalation. Also, restoring the wrong virtual machine when the restore is a destructive restore can lead to serious problems and down time.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
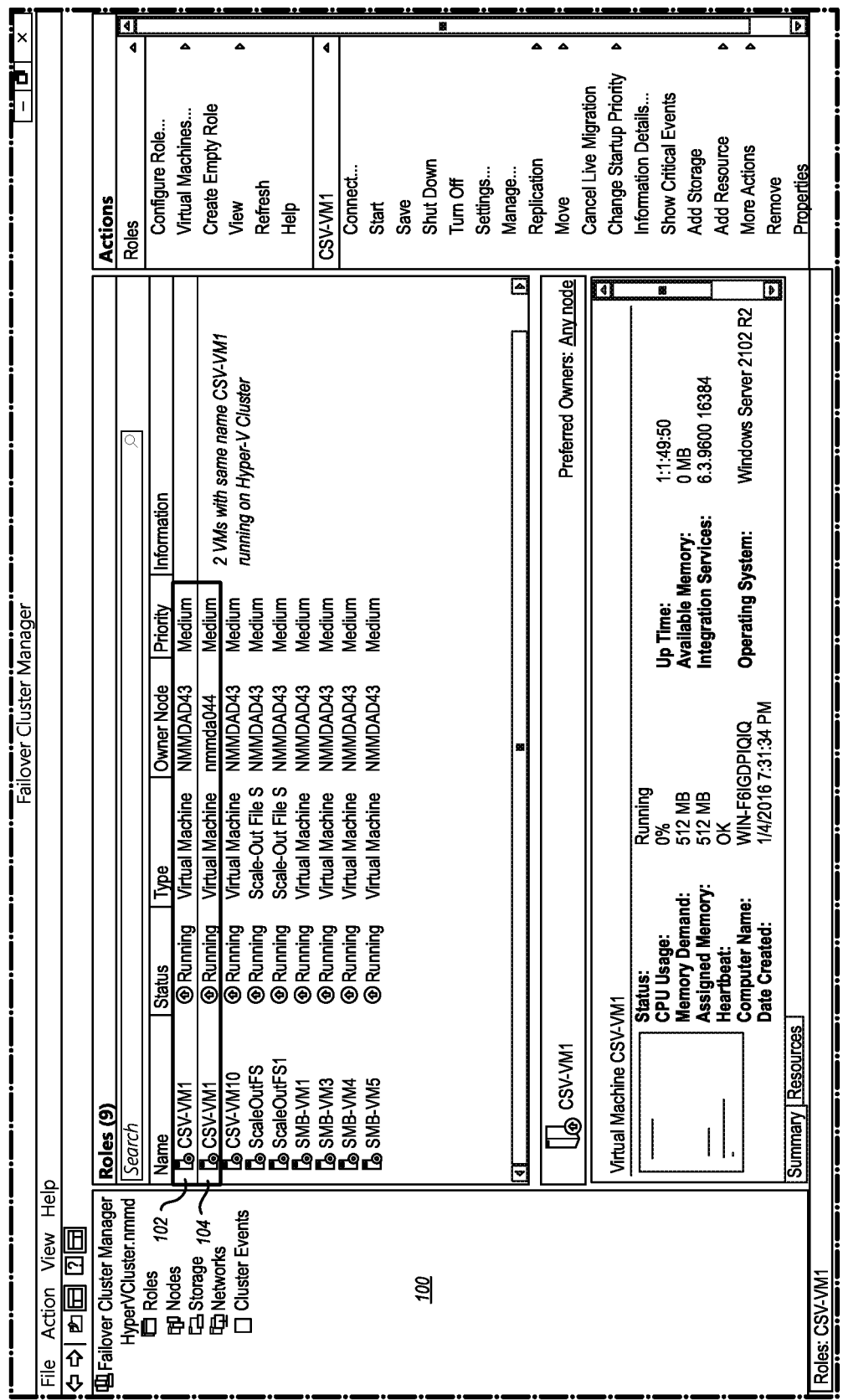
FIG. 1 illustrates an example of a user interface used in cluster management.

Embodiments of the invention relate to systems and methods for protecting data. Embodiments of the invention relate to systems and methods for protecting data, for example, in a datacenter or cloud environment and more particularly in the context of a computing cluster. Embodiments of the invention further relate to systems and methods for protecting data in a multi-tenant distributed hypervisor cluster. As discussed herein, data protection operations may include backup operations, restore operations, and the like.

Embodiments of the invention ensure that resources such as virtual machines are backed up in a manner that allows the backups to be uniquely identified, for example, in the context of a multi-tenancy environment. Embodiments of the invention can be applied in various environments including private clouds, hybrid clouds, public clouds, datacenters, and the like.

By way of example and not limitation, a tenant may be an application or user that may require its own secure and exclusive computing environment. Alternatively stated, multi tenancy refers to an architecture where a single instance of software may run on a server and serve multiple tenants. A tenant may be a group of users that share common access and that may have special privileges to the software. However, this does not prevent tenants from sharing various aspects of a datacenter or cloud or of a computing cluster. For example, multiple tenants may share platforms, infrastructure, and/or software to varying degrees. In one example, data protection operations may be shared by multiple tenants.

For example, a backup application may be configured to backup a cluster even though the various virtual machines operating within the cluster may belong to multiple and/or different tenants. As previously described, a multi-tenant distributed cluster may lead to a situation where the names of the virtual machines may be duplicated.

In some examples of a hypervisor cluster (or other cluster or computing environment), a backup may be created by a backup server that cooperates with a service (e.g., Volume Shadow Copy Service) associated with the cluster. For example, the service may coordinate actions in order to ensure that a consistent backup (e.g., snapshot, point in time copy, etc.) is created. The service may interact with various components such as a requestor (e.g., a backup application), a writer that prepares data or a volume for backup at least by ensuring data consistency, and a provider (which may be the same as the requestor) that creates and maintains the backups.

When backing up a hypervisor cluster environment, the backup application or requestor may ask the service to identify or enumerate the writers and prepare for a backup. The writers prepare a description of the components and data stores that need to be backed up. This information is provided to the backup application or the backup server.

For example, a writer may be associated with one or more virtual machines in the cluster. The writer may identify the components of the virtual machines to be backed up as well as a description of the components.

The writer may then prepare the data or virtual machines for backup. This may include completing transactions, flushing caches, or the like to ensure that the data or virtual machine is in a consistent state. The backup application can then proceed to create a backup (e.g., a snapshot, a full copy or backup, a copy on write, or the like).

More specifically, a backup application may use a service when generating a save set, which is a copy of or a backup of, for example, a virtual machine. The save set is constructed by querying a writer of the service. The writer returns a component identifier of the virtual machine. This component identifier returned by writer, however, may not be relevant to the backup administrator because the component identifier has no connection to the name of the virtual machine.

The backup application thus maps the component identifier returned by the writer to the name of the virtual machine.

The save set in this environment may be a combination of the application cover saveset (APPLICATIONS:\Hypervisor\) and the component (VM Name) mapped to the component identifier returned by the writer. Thus the save set for hypervisor in the context of the backup application may be identified as "APPLICATIONS:\Hypervisor\<VM_Name>".

In one example a backup application save set includes the cover save set plus a component from the map.

When the backup or backup operation is performed at the cluster level (e.g., backing up the cluster as a whole), the backup application constructs the save set by querying the writer and mapping the component identifier to the name of the virtual machine. When the computing environment is distributed and multi-tenant there is a possibility that multiple virtual machines are created with the same name. In such a case, the map created by querying the writer and getting its corresponding name may result in multiple instances of virtual machine names that are the same. The information provided by the writer fails to uniquely identify each virtual machine at the virtual machine name level. These names are used to construct the save set information. This results in the creation of multiple save sets with same name.

Figure 2:
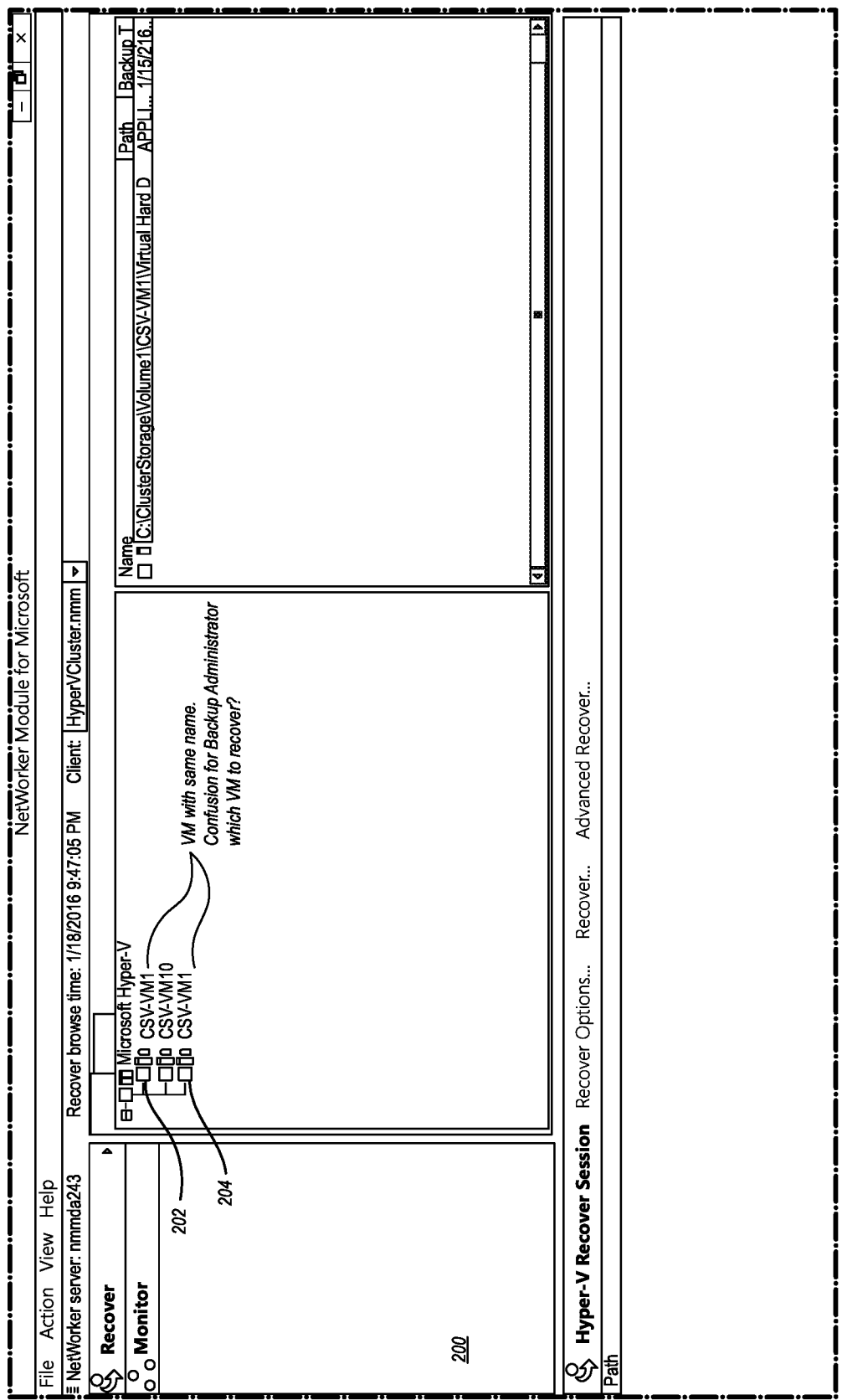
FIG. 2 illustrates an example of a user interface of a data protection application and illustrates save sets of virtual machines that have the same name.

This scenario is depicted in FIGS. 1 and 2. FIG. 1 illustrates an example of a user interface used in cluster management. FIG. 1 illustrates that two virtual machines in the cluster have the same name in the user interface 100. As a result, the save sets are difficult to distinguish. For example, the virtual machines 102 and 104 have the same name. Further, the virtual machines 102 and 104 may belong to different tenants.

FIG. 2 illustrates a user interface of a backup application and illustrates save sets with the same name. FIG. 2 illustrates a user interface 200 that may be used or shown during a data protection operation, such as a backup or restore. FIG. 2 illustrates a save set 202 and a save set 204. The save sets 202 and 204 have the same name. As previously stated, this may create confusion during a restore operation.

Embodiments of the invention allow data protection systems to avoid name confusion. In one example, a virtual machine may be associated with a globally unique identifier (GUID). This unique identifier is incorporated into the name of the save set so that the virtual machine can be uniquely identified, particularly during a restore operation. This allows a backup administrator to identify a virtual machine in a distributed and multi-tenant environment.

For example, a backup system or application that uses a saveset syntax such as "Applications:\Hypervisor\VMname" is not sufficient. To aid a backup administrator, for example, embodiments of the invention incorporate a unique aspect of the data (e.g., a virtual machine) so that the correct data or virtual machine can be selected, for example during a restore operation.

In one example, the hypervisor manager may be queried (e.g., using PowerShell) as illustrated by the following pseudocode. This query may return various information about a particular virtual machine including a GUID (VMId).

```
PS C:\Users\administrator.MSAPPS> get-vm -Name csv_vm1 | fl *
.
.
.
VMName                  : csv_vm1
VMId                    : 04186ac0-08b7-4a3d-a7c9-96f4dba5c22e
.
.
.
CheckpointFileLocation  : C:\ClusterStorage\Volume1\csv_vm1
ConfigurationLocation   : C:\ClusterStorage\Volume1\csv_vm1
NetworkAdapters         : {Network Adapter}
CimSession              : CimSession: .
ComputerName            : PWSVR037
IsDeleted               : False
.
.
.
VMName                  : csv_vm1
VMId                    : 5f532d5a-1fd2-4db1-a257-bedd5c2953d0
.
.
.
CheckpointFileLocation  : C:\ClusterStorage\Volume2\csv_vm1
ConfigurationLocation   : C:\ClusterStorage\Volume2\csv_vm1
NetworkAdapters         : {Network Adapter}
CimSession              : CimSession: .
ComputerName            : MSSVR0120
IsDeleted               : False
```

The result of this query includes a virtual machine identifier (VMId), which is an example of GUID. The GUID can be appended to the virtual machine name. This creates a distinct name and identify for each save set. By appending the GUID to the virtual machine's name, the save sets are changed as follows:

TABLE 1

| Without GUID | With GUID |
| --- | --- |
| APPLICATIONS:\hypervisor\VMname | APPLICATIONS:\hypervisor\VMnameGUID1 |
| APPLICATIONS:\hypervisor\VMname | APPLICATIONS:\hypervisor\VMnameGUID2 |

As illustrated in table 1, the names of the save sets without the GUID are the same and may lead to confusion. The names of the save sets with the GUID are distinguishable using the name alone.

In one example, the GUID or VMId returned in response to the query may only be used to refer to a virtual machine. As previously indicated, the VMId is an internal representation and has little value to a hypervisor user. However, the GUID is helpful in the context of the backup application because it facilitates data protection operations and improves the functioning of the backup application and of the cluster.

In one embodiment, attributes of a virtual machine may also be collected. One or more of these attributes can be used to further identify the virtual machine that needs to be mounted from backup media during restoration. A restoration may include restoring a file, multiple files, a virtual machine, or the like.

By collecting multiple attributes for a virtual machine or for each virtual machine being backed up, the correct virtual machine for a data protection operation such as a restore operation can be identified in other ways. For example, attributes such as creator of the virtual machine, creation time, RAM size, number of hard disk and size, virtual machine operating system, or the like may be collected.

Figure 3:
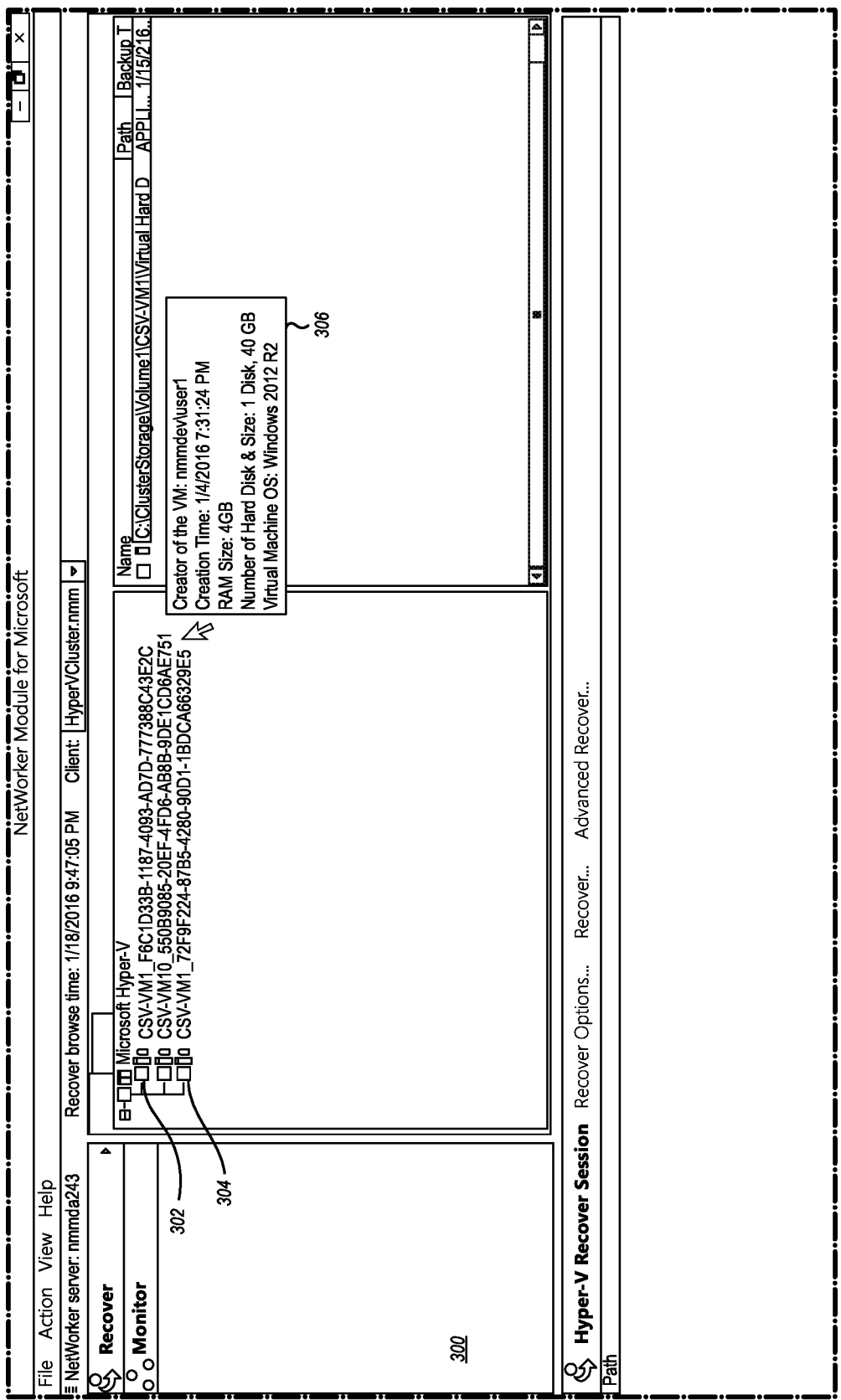
FIG. 3 illustrates an example of a user interface of a data protection application and illustrates that the names of the save sets have been changed to include a unique identifier so that virtual machines that have the same name can be distinguished in the context of a data protection operation.

FIG. 3 illustrates an example of a user interface configured to display the attributes of virtual machines associated with or identified by save sets. FIG. 3 illustrates an example of a user interface of a data protection application and illustrates that the names of the save sets have been altered to include a unique identifier so that virtual machines that have the same name can be distinguished in the context of a data protection operation.

FIG. 3 illustrates an example of a user interface 300. In FIG. 3, the virtual machines 302 and 304 are distinguishable because the unique GUIDs are part of the save set identification. Further, when a device such as a mouse hovers over a particular save set such as the save set 304, certain attributes 306 of the virtual machine may be displayed in the user interface 300. The attributes 306, or virtual machine metadata, may aid a backup administrator in choosing a virtual machine to be restored in a multi-tenant environment.

FIG. 3 further illustrates results of a command to display save sets. A command to display save sets may display the save sets that a user can select for backup or restore.

Figure 4:
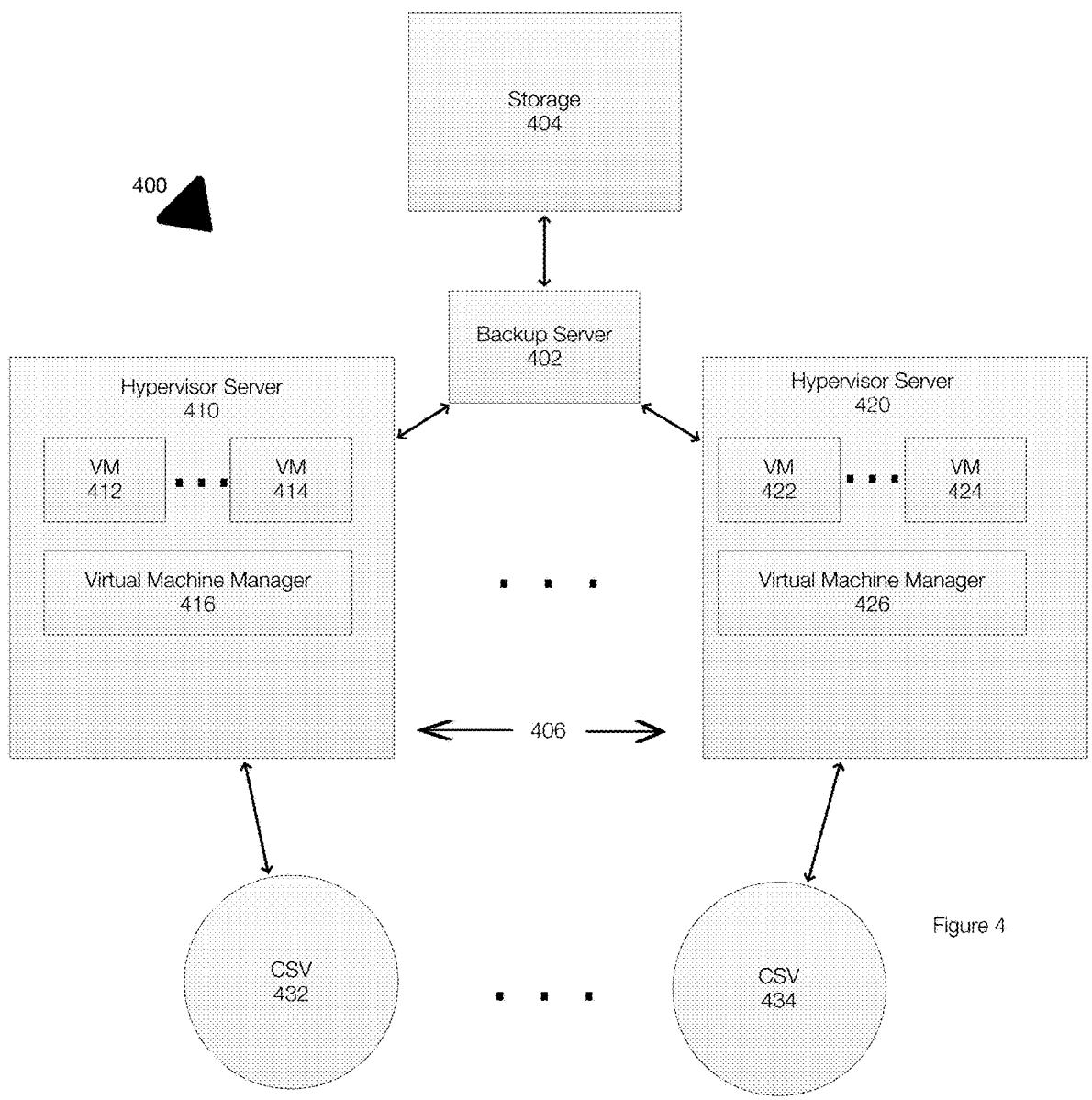
FIG. 4 illustrates an example of a computing system that includes a cluster in which embodiments of the invention may be implemented.

FIG. 4 illustrates an example of a computing environment that includes a computing cluster. More specifically, FIG. 4 illustrates a computing system 400 (e.g., a cloud environment, a datacenter, or other networked computing system). In this example, the computing system 400 includes a cluster 406, which is represented by and includes hypervisor servers 410 and 420 but which may include a larger number of servers.

A computing cluster is typically a set of connected computers that may operate together. For example, the cluster 406 may be a distributed and/or multi-tenant cluster. Each server in the cluster 406 may be a node. The cluster 406 can provide load-balancing, failover, and the like. Each server or node in the cluster 406 may support and operate virtual machines. For example, the server 410 supports the virtual machines 412 and 414 and the server 420 supports the virtual machines 422 and 424.

The virtual machine managers or monitors (VMMs) 416 and 426 are examples of management solutions or hypervisors that may be used to configure and manage virtualized computing systems. The VMMs 416 and 426 enable the creation, deployment, deletion and management of the virtual machines resident in the hypervisor servers. The VMMs 416 and 426 can also edit, start and stop virtual machines.

The backup server 402 may be configured to provide or perform data protection operations including, for example, backup operations and restore operations. During backup operations, save sets are typically generated and the save sets generated by the backup server 402 may be stored in a storage device 404. The storage device 404 (e.g., hard disk drives, magnetic storage devices, optical storage devices, flash memory) may be a storage array, cloud storage, distributed storage, or the like or other device or set of storage devices. In addition, the storage 404 may be part of the same datacenter or cloud in which the cluster 406 operates. The backup server 402 may coordinate with agents (modules or computer executable instructions) to perform data protection operations for specific virtual machines. The agents may operate or execute on a server, on a virtual machine, or be implemented as a cluster resource.

In one example, the backup server 402 may perform a backup operation for the cluster 406 as a whole. Thus, the backup server 402, which may cooperate with one or more agents, may generate save sets corresponding to or identifying backups of the virtual machines. In some example, the save set is the backup. FIG. 2, for example, illustrates save sets for three virtual machines, two of which have the same name.

Because the cluster 406 is backed up as a whole and because a restore process may be applied to a specific virtual machine, embodiments of the invention ensure that the correct virtual machine can be identified. As discussed herein, the name of the save set for a virtual machine, in addition to incorporating the GUID, may be augmented with attributes. This allows virtual machines to be distinguished and helps prevent virtual machines from being restored incorrectly based on the name of the virtual machine alone.

Figure 5:
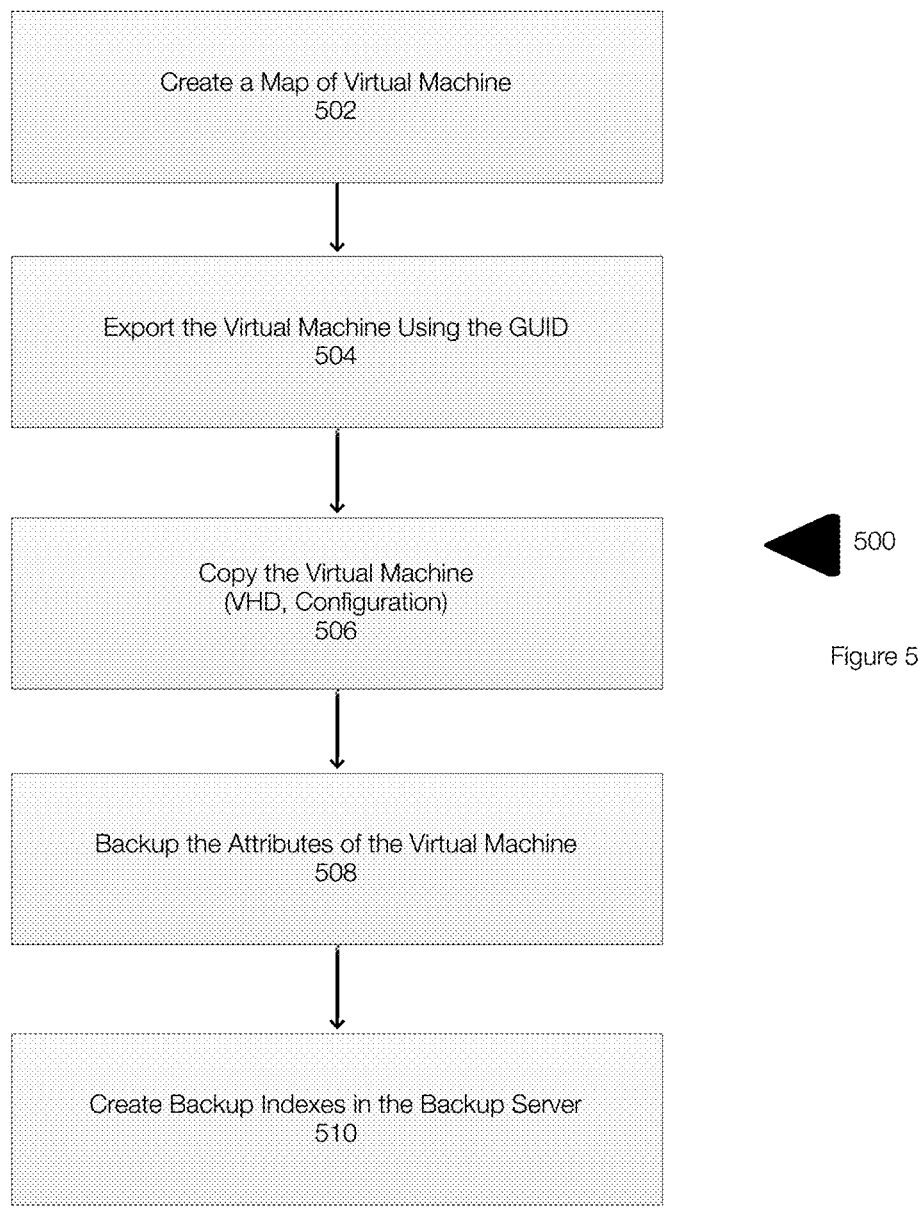
FIG. 5 illustrates an example of a method for performing a backup operation.

FIG. 5 illustrates an example of a method for performing a data protection operation. More specifically, FIG. 5 illustrates an example of a method 500 for performing a backup operation. FIG. 5 is described in the context of a single virtual machine. However, the steps or acts of the method 500 may be performed for each virtual machine that is being backed up. Further, the method 500 can be applied to multiple virtual machines at the same time.

Initially, a map of each virtual machine is created 502. More specifically, a map is created that relates the name and GUID of a virtual machine to the attributes of the virtual machine. Table 2 maps the virtual machines and GUIDs to attributes.

For example:

TABLE 2

| VM | VM Name | VM Creator | Creation Time | RAM Size | Number of Hard Disks | Hard Disk Size | VM Operating System |
|---|---|---|---|---|---|---|---|
| VM1GUID1 | VM1 | User1 | Date/time | 4 GB | 1 | 40 GB | Windows |
| VM!GUID2 | VM1 | User2 | Date/Time | 2 GB | 1 | 60 GB | RHEL |

After the map is generated for a virtual machine, the virtual machine is exported 504 using the GUID of the virtual machine. In one example, a request is made to a virtual machine manager to export a virtual machine. This may also include requesting the service to perform a snapshot of the virtual machine. The export may result in various files including a virtual hard disk (VHD) and configuration files (e.g., save sets).

Next, the virtual machine is copied 506 to storage by the backup server. This may include copying the VHD and the configuration files to the storage. The attributes from the map may be backed up 508, by way of example, in an XML file.

Next, backup indexes are created 510. The indexes allows the save sets to be located. The indexes have the format shown, by way of example, in FIG. 3 and may have the following format: APPLICATIONS:\HYPERVISOR\VMNAME_VMGUID.

Figure 6:
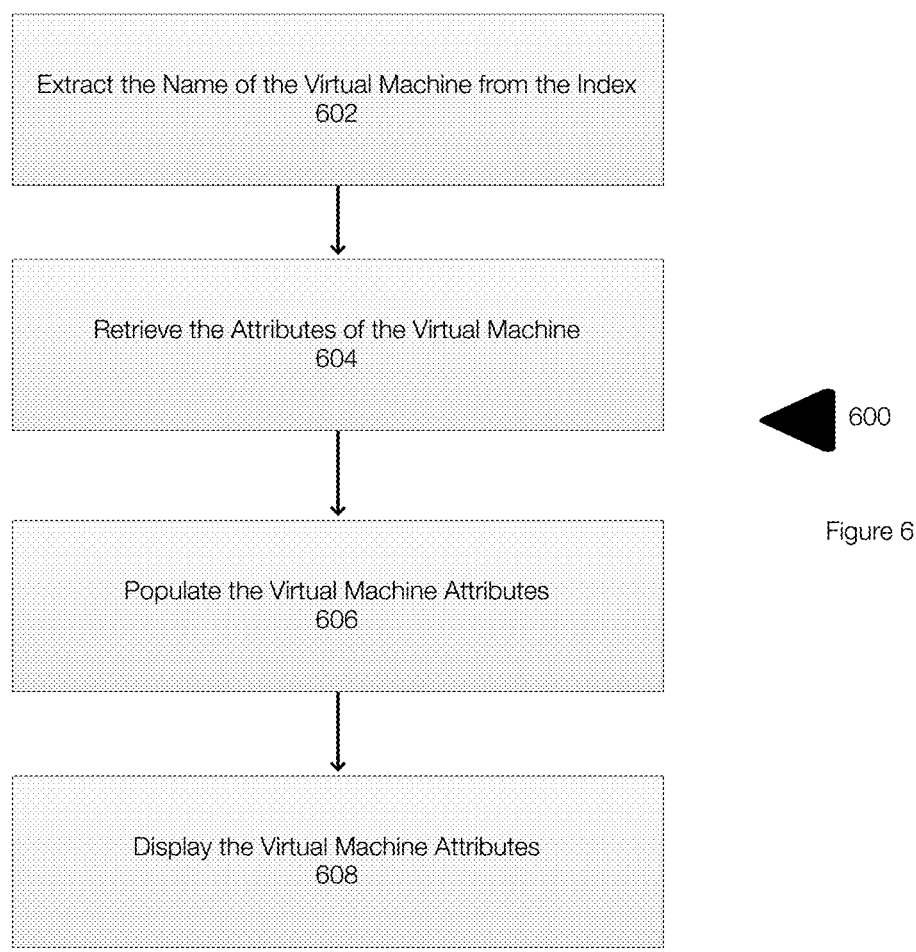
FIG. 6 illustrates an example of a method for generating a user interface in the context of a restore operation.

FIG. 6 illustrates an example of a method for generating a user interface in the context of a data protection operation. More specifically, FIG. 6 illustrates a method 600 for generating or displaying a recovery interface in the context of a data protection operation.

Initially, the name/names of a virtual machine/virtual machines or save sets is/are extracted 602 from the index and presented in a user interface. Next, the attributes of the virtual machine are retrieved 604 from the index or the XML file that was backed up with the virtual machine. A structure is then populated 606 with the attributes. The attributes from the structure may be displayed 608 when a mouse hovers over the virtual machine name.

Embodiments of the invention allow each virtual machine in a distributed multi-tenant environment to be uniquely identified. IN addition, important properties or attributes of each virtual machine can be displayed to a user such as a backup administrator. By providing this type of information, incorrect restore operations are avoided, which improves the operation and function of the cluster. In addition, embodiments of the invention ensure that major data loss and down time are avoided. Finally, restore operations can be performed more quickly, thus improving the operation of the system, because the correct save set can be located and identified more quickly.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing cluster that is backed up at a cluster level, a method for performing a data protection operation for virtual machines in the cluster, the method comprising:
   for each virtual machine:
   creating a map of a virtual machine by a backup server, wherein the map associates a name and a unique identifier of the virtual machine with attributes of the virtual machine;

storing a copy of the virtual machine in a storage as a save set, by the backup server;

naming the save set such that the unique identifier is included in the name of the save set and such that the save set of the virtual machine can be distinguished from the save sets of other virtual machines that have the same virtual machine name;

backing up the attributes of the virtual machine, by the backup server; and creating backup indexes by the backup server wherein the backup indexes, when displayed, shows the save set names that include the unique identifier; and displaying slave sets available for a restore operation in a user interface;

displaying attributes of a particular save set when a selection mechanism hovers over a name of a particular save set.

2. The method of claim 1, further comprising exporting the virtual machine using the unique identifier.

3. The method of claim 2, further comprising querying the virtual machine to determine the unique identifier.

4. The method of claim 1, wherein the copy of the virtual machine includes a virtual hard disk and configuration files.

5. The method of claim 1, wherein the backup indexes include save set names that incorporate the unique identifiers of the save sets.

6. The method of claim 1, further comprising displaying the attributes of each displayed save set.

7. The method of claim 2, further comprising performing a snapshot of the virtual machine.

8. A non-transitory computer readable medium comprising computer executable instructions executable by one or more processors to perform operations in a multi-tenant computing cluster for performing a data protection operation for virtual machines in the cluster, including for virtual machines in different tenants having a same name, the operations comprising:

for each virtual machine, including at least one virtual machine for a first tenant in the computing cluster having the same name as a virtual machine for a different second tenant in the computing cluster:

creating a map of a virtual machine by a backup server, wherein the map associates a name and a unique identifier of the virtual machine with attributes of the virtual machine;

storing a copy of the virtual machine in a storage as a save set, by the backup server;

naming the save set such that the unique identifier is included in the name of the save set and such that the save set of the virtual machine can be distinguished from the save sets of other virtual machines in other tenants that have the same virtual machine name;

backing up the attributes of the virtual machine, by the backup server; and creating backup indexes by the backup server wherein the backup indexes, when displayed, shows the save set names that include the unique identifier; and displaying save sets available for a restore operation in a user interface;

displaying attributes of a particular save set when a selection mechanism hovers over a name of a particular save set.

9. The non-transitory computer readable medium of claim 8, the operations further comprising exporting the virtual machine using the unique identifier.

10. The non-transitory computer readable medium of claim 9, the operations further comprising querying the virtual machine to determine the unique identifier.

11. The non-transitory computer readable medium of claim 8, wherein the copy of the virtual machine includes a virtual hard disk and configuration files.

12. The non-transitory computer readable medium of claim 8, wherein the backup indexes include save set names that incorporate the unique identifiers of the save sets.

13. The non-transitory computer readable medium of claim 8, the operations further comprising displaying the attributes of each displayed save set.

14. The non-transitory computer readable medium of claim 9, the operations further comprising performing a snapshot of the virtual machine.

* * * * *